(12) United States Patent
Gutjahr

(10) Patent No.: US 10,968,641 B2
(45) Date of Patent: Apr. 6, 2021

(54) DECOUPLING MAT FOR A SURFACE COVERING STRUCTURE THAT CAN BE COVERED BY COVERING ELEMENTS

(71) Applicant: ARDEX ANLAGEN GMBH, Witten (DE)

(72) Inventor: Walter Gutjahr, Bickenbach (DE)

(73) Assignee: ARDEX ANLAGEN GMBH

( * ) Notice: Subject to any disclaimer, the term of this patent is extended or adjusted under 35 U.S.C. 154(b) by 0 days.

(21) Appl. No.: 15/306,097

(22) PCT Filed: Apr. 24, 2014

(86) PCT No.: PCT/EP2014/058407
§ 371 (c)(1),
(2) Date: Jun. 25, 2017

(87) PCT Pub. No.: WO2015/161888
PCT Pub. Date: Oct. 29, 2015

(65) Prior Publication Data
US 2017/0292278 A1    Oct. 12, 2017

(51) Int. Cl.
*E04F 15/18* (2006.01)
*E04F 15/20* (2006.01)
(Continued)

(52) U.S. Cl.
CPC .............. *E04F 15/182* (2013.01); *B32B 3/30* (2013.01); *B32B 5/022* (2013.01); *B32B 5/024* (2013.01);
(Continued)

(58) Field of Classification Search
CPC ...... E04F 15/182; E04F 15/186; E04F 15/206
(Continued)

(56) References Cited

U.S. PATENT DOCUMENTS 1,812,315 A * 6/1931 Baumgartner ......... F23M 5/085
110/336
3,597,891 A * 8/1971 Martin .................... B62D 29/04
52/145
(Continued)

FOREIGN PATENT DOCUMENTS

DE        29807258      9/1998
DE      102007056587    5/2009
(Continued)

*Primary Examiner* — Brian D Mattei
*Assistant Examiner* — Joseph J. Sadlon
(74) *Attorney, Agent, or Firm* — Agris & von Natzmer LLP; Joyce von Natzmer

(57) ABSTRACT

A decoupling mat (1) for a surface covering structure that can be covered by covering elements has a strip- or plate-shaped compensation element (2) which has upwardly projecting formations (4) arising from a lower support plane (3), which formations from an upper covering plane (6) at a distance from the lower support plane (3) and are arranged spaced apart from one another and have at least in sections an undercut (8) along their periphery. A water-permeable cover is fixed on a bottom side (12) of the lower support plane (3) and prevents penetration by a viscous adhesive into the upwardly projection formations (4). On at least some formations (4), the undercuts (8) are arranged along a region, extending in a curved manner, along a side wall of the upwardly projecting formations. A plurality of the first undercuts (8) is oriented in a first direction and a plurality of second undercuts (8) is oriented in a second direction. The cover may have a perforation or consist of a water permeable textile woven fabric or sheet, or of a water permeable non-woven fabric (13). A plurality of adjacent formations (4) are respectively connected to one another by ventilation ducts (7) projecting from the lower support plane (3), wherein the ventilation ducts (7) do not extend up to the upper covering plane (6).

19 Claims, 9 Drawing Sheets

Figure 1:
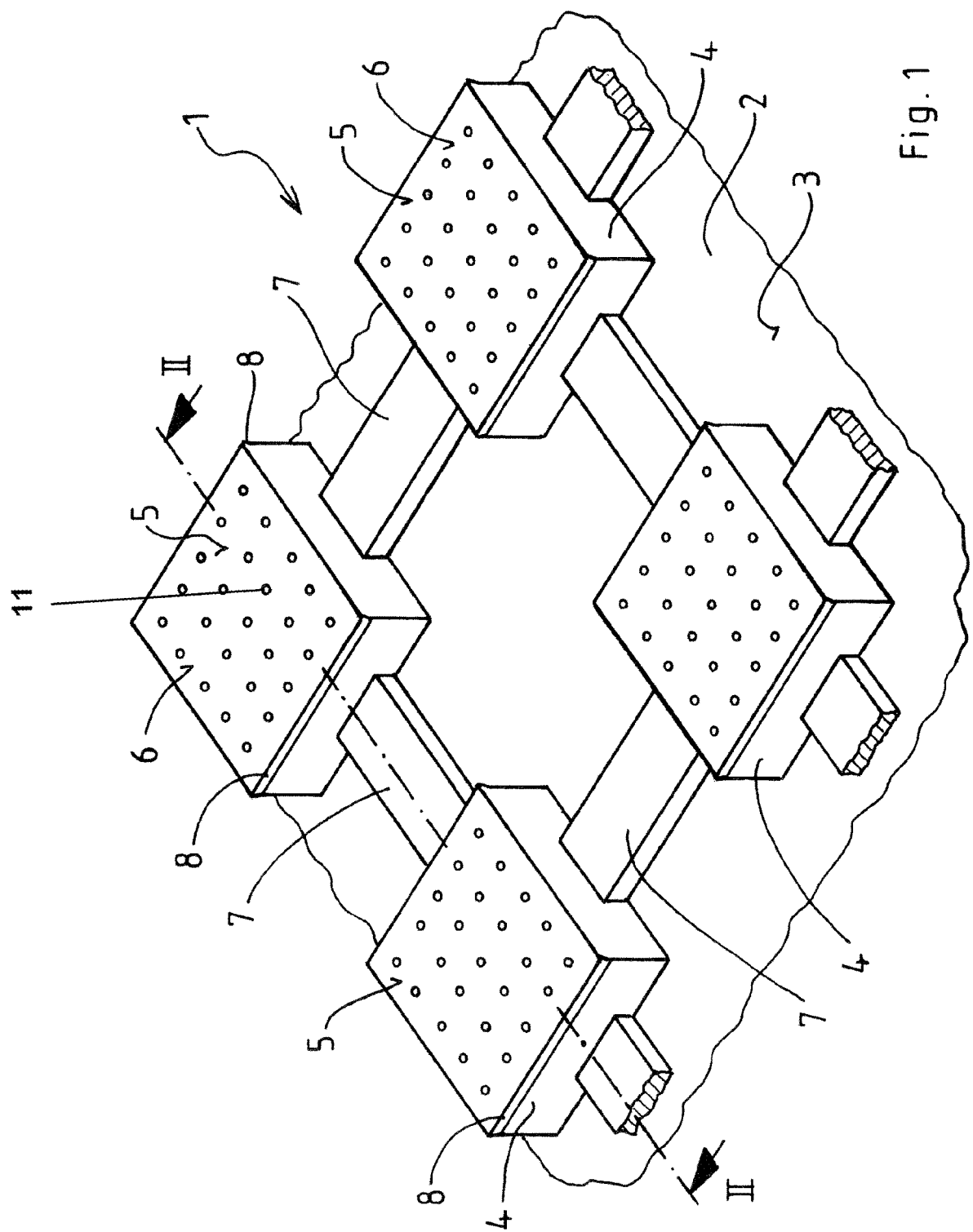

(51) Int. Cl.
*B32B 3/30* (2006.01)
*B32B 5/02* (2006.01)
*B32B 7/12* (2006.01)

(52) U.S. Cl.
CPC ............... *B32B 5/028* (2013.01); *B32B 7/12* (2013.01); *E04F 15/183* (2013.01); *E04F 15/185* (2013.01); *E04F 15/186* (2013.01); *E04F 15/206* (2013.01); *B32B 2471/04* (2013.01); *B32B 2607/02* (2013.01)

(58) Field of Classification Search
USPC ........................................................ 52/302.3
See application file for complete search history.

(56) References Cited

U.S. PATENT DOCUMENTS

| | | | | |
|---|---|---|---|---|
| 3,687,771 | A * | 8/1972 | Meijer | B05D 1/286 |
| | | | | 156/232 |
| 3,694,306 | A * | 9/1972 | Fricklas | E04B 1/941 |
| | | | | 428/341 |
| 3,696,571 | A * | 10/1972 | Schluter | E04B 9/14 |
| | | | | 52/144 |
| 4,381,630 | A * | 5/1983 | Koester | E04B 1/7023 |
| | | | | 52/169.5 |
| 4,397,126 | A * | 8/1983 | Nelson | E04D 11/02 |
| | | | | 52/199 |
| 4,573,299 | A * | 3/1986 | Meroni | B32B 3/12 |
| | | | | 52/513 |
| 4,647,496 | A * | 3/1987 | Lehnert | B28B 19/0092 |
| | | | | 442/386 |
| 4,850,165 | A * | 7/1989 | Ohern | B32B 21/08 |
| | | | | 52/199 |
| 4,910,935 | A * | 3/1990 | Leukel | E04B 5/48 |
| | | | | 52/144 |
| 4,917,933 | A * | 4/1990 | Schluter | E04B 1/762 |
| | | | | 428/107 |
| 5,042,569 | A * | 8/1991 | Siegmund | F24D 3/142 |
| | | | | 165/56 |
| 5,259,157 | A * | 11/1993 | Ault | E01F 8/007 |
| | | | | 52/145 |
| 5,263,289 | A * | 11/1993 | Boyd | E04F 15/02494 |
| | | | | 52/220.2 |
| 5,551,204 | A * | 9/1996 | Mayrand | E04B 1/161 |
| | | | | 52/795.1 |
| 5,619,832 | A | 4/1997 | Myrvold | |
| 6,018,927 | A * | 2/2000 | Major | B32B 3/28 |
| | | | | 52/793.1 |
| 6,151,854 | A | 11/2000 | Gutjahr | |
| 6,261,394 | B1 * | 7/2001 | Raineri | B32B 7/06 |
| | | | | 156/63 |
| 6,434,901 | B1 | 8/2002 | Schlueter | |
| 6,769,215 | B1 * | 8/2004 | Carkner | E04D 5/12 |
| | | | | 156/71 |
| 6,777,063 | B2 * | 8/2004 | Born | E04F 13/047 |
| | | | | 428/167 |
| D523,968 | S * | 6/2006 | Gilbert | E04D 11/02 |
| | | | | D25/55 |
| 7,250,570 | B1 * | 7/2007 | Morand | F24D 3/141 |
| | | | | 174/37 |
| 7,326,661 | B2 * | 2/2008 | Sultan | B32B 17/04 |
| | | | | 442/178 |
| 7,488,523 | B1 * | 2/2009 | Muncaster | B32B 11/04 |
| | | | | 404/17 |
| 7,493,738 | B2 * | 2/2009 | Bui | E04C 2/06 |
| | | | | 52/578 |
| 7,536,835 | B2 * | 5/2009 | Schluter | E04F 15/08 |
| | | | | 52/302.1 |
| 7,594,362 | B2 * | 9/2009 | Sigmund | E04D 13/152 |
| | | | | 52/94 |
| 7,784,236 | B2 * | 8/2010 | Barr | B32B 7/12 |
| | | | | 52/454 |
| 7,918,055 | B2 * | 4/2011 | Cotten | E02D 31/02 |
| | | | | 52/169.5 |
| D654,600 | S * | 2/2012 | Devine | B05D 1/38 |
| | | | | D25/138 |
| 8,176,694 | B2 * | 5/2012 | Batori | E04F 15/18 |
| | | | | 52/220.2 |
| 8,256,179 | B2 * | 9/2012 | Nasvik | C04B 28/02 |
| | | | | 52/516 |
| 8,516,760 | B2 * | 8/2013 | Julton | E04D 11/002 |
| | | | | 52/309.8 |
| 8,551,597 | B2 * | 10/2013 | Kowalski | E04C 2/365 |
| | | | | 428/116 |
| 8,695,300 | B2 * | 4/2014 | Hartl | E04F 15/18 |
| | | | | 52/302.1 |
| 8,795,814 | B2 * | 8/2014 | Braun | B05D 1/38 |
| | | | | 428/172 |
| 8,950,141 | B2 * | 2/2015 | Schluter | E04F 15/182 |
| | | | | 52/390 |
| 9,228,749 | B2 * | 1/2016 | Morand | E04F 15/18 |
| 9,259,908 | B2 * | 2/2016 | Iizuka | B32B 27/20 |
| 9,259,909 | B2 | 2/2016 | Mittelbach et al. | |
| 9,771,714 | B2 * | 9/2017 | Castelle | B32B 25/08 |
| 9,790,682 | B2 * | 10/2017 | O'Neill | B32B 5/06 |
| 9,873,547 | B2 * | 1/2018 | Tippmann | B65D 71/0096 |
| 2006/0014009 | A1 * | 1/2006 | Weidner | E04F 15/163 |
| | | | | 428/304.4 |
| 2009/0230113 | A1 * | 9/2009 | Batori | F24D 3/142 |
| | | | | 219/213 |

FOREIGN PATENT DOCUMENTS

| | | | | |
|---|---|---|---|---|
| DE | 102007056587 A1 * | 5/2009 | ............ | B32B 37/24 |
| EP | 2453071 A1 * | 5/2012 | ............ | E04D 11/005 |
| EP | 2453071 A1 | 5/2012 | | |
| WO | 0042258 A1 | 7/2000 | | |
| WO | WO-0042258 A1 * | 7/2000 | ............ | E04D 11/005 |
| WO | 2004018789 A1 | 3/2004 | | |
| WO | WO-2004018789 A1 * | 3/2004 | ............ | E04B 1/7612 |

* cited by examiner

DECOUPLING MAT FOR A SURFACE COVERING STRUCTURE THAT CAN BE COVERED BY COVERING ELEMENTS

CROSS-REFERENCE TO RELATED APPLICATIONS

This is the U.S. national stage of International application PCT/EP2014/058497, filed Apr. 24, 2014 designating the United States.

The invention relates to a decoupling mat for a surface covering structure that can be covered by covering elements, with a strip- or plate-shaped compensation element which has upwardly projecting protrusions arising from a lower support plane, which form an upper support plane at a distance from the lower support plane.

Various decoupling mats are known in practice, which are arranged under a floor covering or a wall covering. On the one hand, such decoupling mats are there to ensure a sufficient stress-resistance and durable connection of the floor- and wall covering to the respective ground and on the other hand to prevent that mechanical tensions occur between the floor or wall covering and the respective subfloor, which could lead to a damage of the coverings or to a partial detachment of the covering from the ground.

In particular on heatable floor constructions which are exposed to changing temperatures, greater temperature fluctuations may occur, as well between the covering elements on the one hand and the subfloor on the other hand, but also over time. The materials used in each case usually have a different expansion behavior depending upon temperature fluctuations, so that in case of changing temperatures or direct solar irradiation near window facades, considerable mechanical stress can occur between the covering elements and the subfloor.

Most decoupling mats have a profiled surface with a large number of projecting protrusions and depressions. It has turned out that horizontally-acting shear forces can be reduced at the preferably numerous projections and depressions. In connection with nonwoven clinging fabrics and fabric meshes fixed to the compensation element on one side or on both sides, a connection having high stress resistance of the decoupling mats to the subfloor and to an adhesive mortar or another suitable fixing material can be effected, by means of which the covering elements are fixed to the decoupling mat.

It has been proven that such decoupling mats, as they are described in EP 1 073 813 B1 or in U.S. Pat. No. 5,619,832, for example, can ensure a sufficient decoupling effect for many areas of applications.

However, it is considered as a disadvantage that such decoupling mats often form a water-impermeable separating layer between the subfloor and the covering elements. In practice, usually mineral adhesive mortars or other, initially paste-like and then curing adhesive materials are applied to the subfloor to produce a planar surface and to the decoupling mats to the subfloor. When, immediately after that, the decoupling mats are placed on the not completely cured adhesive mortar, the release of humidity from the adhesive mortar is impeded and a curing of the adhesive mortar is delayed, which keeps being wet and can not be fully stressed for a longer time, so that subsequent products will also be delayed. Whereas, in some cases a water-tight sealing of the covering elements with the subfloor is desired, a profiled surface of the decoupling mats regularly results in accumulation and retention of humidity in the projecting protrusions and depressions. Regarding the exterior, a discoloration or, in particular in the case of frost, damage of the covering elements or the laying mortar may occur, for example as well as due to frequent wet and dry cycles.

Different drainage mats are known in practice, which are configured to be moisture-permeable and which reduce or may even completely exclude an undesired accumulation of moisture below or above the drainage mats. Individual exemplary embodiments are described in DE 298 07 258 U1 or in U.S. Pat. No. 6,151,854, for example.

The different requirements for a mechanical decoupling on the one hand and for a most efficient dehumidification on the other hand, however, often result in the decoupling mats or drainage mats known from the prior art not being equally suitable for all purposes. A complex shape of the strip- or plate-shaped compensation element which is usually produced from a suitable plastic material, in connection with the non-woven clinging fabric and grid mats attached thereto often result in a comparatively high production effort.

It is therefore considered an object of the present invention to configure a decoupling mat of the above type in such a way, that a most advantageous decoupling effect possible can be achieved with a smallest possible production effort. Furthermore, it would be desirable if the decoupling mat does not retain the humidity in the subfloor or in a screed or adhesive mortar, but enables and promotes a fast discharge of the humidity.

According to the invention, this object is achieved by the protrusions being located at a distance to one another, that the protrusions have an undercut at least in sections along their periphery, and in that a water-permeable covering is fixed to an underside of the lower bearing plane, which prevents a penetration of a viscous adhesive into the upwardly protruding protrusions. The protrusions arranged at a distance from one another allow for an efficient absorption and dissipation of shear tensions or comparable mechanical stress acting horizontally in a plane of the compensating element. By the undercuts being arranged along the circumference of the protrusions at least in sections can ensure a connection or clinging with high stress resistance of the protrusions and therefore of the compensation element by means of an adhesive mortar applied on a top side of the compensation element or by an equally-suitable adhesive or fixing material. The undercuts effect a positive fixation.

It has been proven, that a particular advantageous fixation of the adhesive mortar applied to the top side or a curing adhesive mortar can be promoted in that undercuts are arranged at least on certain protrusions along a region, extended in a curved manner, of a side wall of the upwardly-projecting protrusions. The region of the side wall extending in curved manner may either have a concave or convex profile. In this region, the undercut may have a linear course of a side edge of the undercut, so that the area of the undercut protruding from the side wall changes along the course of this side wall. It is also possible, that the undercut has a constant inward or outward protrusion from the protrusion, so that a lateral edge of the undercut follows the course of the side wall in parallel.

In a particular advantageous embodiment of the inventive idea, it is provided in the following, that multiple first undercuts are orientated in a first direction and that multiple second undercuts are orientated in a second direction, with the first direction being different to the second direction. If each upwardly-projecting protrusion comprises an undercut only formed in sections along a side wall in circumferential direction, the direction in which the undercut mainly protrudes laterally can change from each protrusion to the neighboring protrusion. Thus, in a top view onto a top side of the decoupling mat, the undercuts could project to the right and to the left on a first arrangement, whereas the undercuts on a second protrusion arranged adjacent to the first protrusion project upwards and downwards. By the changing direction of the undercuts it can be ensured that there is a connection with high resistance to mechanical stress between the decoupling mat and a layer of adhesive mortar or adhesive material in each spatial direction. Eventually occurring shear tensions can be readily compensated in all directions so that during a hardening process of the adhesive mortar, shrinkage on side walls of the protrusions with undercuts as well as on side walls of protrusions without undercuts can be reduced. At the same time, the structured compensation element can be very easily reshaped, as the orientation of adjacent undercuts changes and the distance of the undercuts, arranged opposite one another or in parallel, can be selected to be sufficiently large.

The protrusions projecting upwards, which are covered on the lower side by a water-permeable covering, form cavities and air chambers in which humidity from the subfloor may accumulate.

The water-permeable covering may have a perforation. In this case, the covering may be a film of a suitable synthetic material which can produced in a cost-effective manner which is fixed to the compensating element on a lower side in a material fitting manner or by a suitable adhesive. The properties relevant for water permeability can be influenced by the number and the dimensions of the individual perforation openings. The individual perforation opening expediently have a sufficiently small diameter to prevent entering of a not yet bound screed or adhesive mortar.

According to an advantageous configuration of the inventive concept, it is provided that the covering consists of a textile woven or laid fabric or of a water-permeable non-woven fabric. A textile material or a non-woven fabric has a structuring, that promotes a clinging of the covering with an initially viscous and later completely cured adhesive mortar or screed material and therefore allows for a fixing of the decoupling mat to the subfloor that is durable and highly-resistant to mechanical stress.

The covering in the type of a textile or a non-woven fabric may consist of an alkali-resistant material, in order to maintain a sufficient mechanical resistance in the long term. In order to allow for a aeration and dehumidification of the subfloor over a large area, in addition to the individual air chambers or bubbles, which are formed in the respective projecting protrusions, it is provided that multiple adjacent protrusions are in each case interconnected by ventilation ducts running along the lower bearing plane, with the ventilation ducts not extending up to the upper bearing plane. The ventilation ducts can be configured to be comparatively flat. The ventilation ducts interconnect adjacent protrusions so that an exchange of air and in particular a moisture transportation is enabled and promoted over multiple, or respectively many protrusions to the edge of the decoupling mat. The ventilation ducts protruding into the adhesive mortar bed and reducing the cross-section only in part contribute to the fact that shrinkage-related tension by protrusion of microcracks in the adhesive mortar or in the compensation element, respectively can be reduced. Tension is reduced in small areas on the projecting protrusions and on the ventilation ducts.

The ventilation ducts, as well as the projecting protrusions, may comprise undercuts. It is not generally required for the ventilation ducts to greatly contribute to the mechanical decoupling or to the fixation of the covering elements by means of undercuts or by a comparatively suitable shape. As the air channels as well as the projecting protrusions create hollow spaces and eventually run in different directions between the protrusions, the ventilation ducts, too, contribute to the reduce of stress and shear forces between the floor and the wall covering and the subfloor.

In order to configure the decoupling mat to be permeable to water, it is advantageously provided that the compensation element has cut-outs or slot in the lower bearing plane. These cut-outs or slots form trough-openings through which humidity can pass from the underside to the top side of the decoupling mat or in reverse direction, respectively.

By a configuration of the decoupling mat that is open to diffusion it can be allowed for that the decoupling mat can be applied to a still humid and eventually not completely solidified subfloor, without that the moisture still present in the subfloor is trapped and the desired drying of the subfloor is prevented or excessively delayed. Therefore, the decoupling mat can be laid shortly after, i.e. faster than unusual after producing the subfloor and quickly be laid on or covered with covering elements, so that no time-consuming or expensive waiting time is required between the individual production steps.

The diffusible property of the decoupling mat can be increased by the covering and the compensation element respectively comprise cut-outs or slots which are arranged overlapping at least in areas. In the overlapping areas, the cut-outs or slots of the covering partially overlapping one another form free through-openings allowing for an unimpeded moisture transport through the through-hole. It has been proven that the dimensions of the overlapping areas can on the one hand be set to be large enough for an efficient moisture permeability and on the other hand be set to be small enough for a small mechanical coupling, so that the decoupling properties of the decoupling mat are not significantly impaired or reduced and at the same time a very efficient dehumidification effect can be enabled.

It is advantageously provided that each upwardly-projecting protrusion has at least one cut-out in the region of the upper bearing plane. This allows for a dehumidification of each air bubble formed in the protrusions towards the covering elements.

The cut outs in the region of the upper bearing plane may be produced rapidly and cost-efficiently in a simple manner in that the upper bearing plane of the compensation element comprises a perforation. The perforation may be produced by a spiked roller, for example rolled over the upper bearing plane of the compensation element with sufficiently high contact pressure. It is also possible to produce the individual cut outs by punching, drilling or slitting of the upper bearing plane.

It is also conceivable that the compensation element has dehumidification openings in the area of the side walls of the upwardly-protruding protrusions. These dehumidification openings can be produced by means of perforation or slitting of the compensation element and selectively before or after fixing the covering on the bottom side of the compensation element. In the case of sufficiently large dehumidification openings in the side walls of the upwardly-protruding protrusions, the not yet completely bound mortar material, which is applied on the top side of the compensation element, can enter therethrough in order to embed or to stick the covering elements together. In this case, some of the mortar or adhesive material entering from the sides moves behind the top side of the projecting protrusions the edges of which in turn form undercuts and effect a form-fit fixing of the adhesive mortar or the adhesive material applied to the top side of the compensation element.

In connection with a perforation of the upper bearing plane or with cut-outs provided in this area, a dehumidification effect can eventually be promoted by the dehumidification openings arranged in the area of the side walls.

In order to produce a noise-reducing effect in addition to the mechanical decoupling and the drainage effect, it is provided that a layer from an impact sound-reducing material is arranged on the compensation element. The impact sound-reducing material may be a layer of a bonded sand crosslinked with a binding agent. Other impact sound-reducing materials are also known, which are arranged on the compensation element and may be equally suitable.

The layer from impact sound-reducing material can also be by a subsequently-produced loose bulk of a suitable pourable or granular-type material.

An additional mechanical securing and fixing of the cover elements on the upper bearing plane of the compensation element may be effected in that a mesh fabric is arranged on the upper bearing plane. The mesh fabric may consist of a high-strength synthetic or fiberglass material. The aperture size of the mesh fabric is expediently large enough in order to permit entering of a not yet bonded and therefore still fluid adhesive mortar, which is applied on the top side of the decoupling mat.

The individual outwardly projecting protrusions may have a convex or non-convex cross-sectional area, wherein the cross-sectional area is orientated parallel to the lower or upper bearing plane. In the case of a non-convex cross-sectional area, at least in the case of some pairs of points within the cross-sectional area, an area of a connection line of the two points is outside the cross-sectional area. The protrusions may have a kidney-shaped cross-sectional area, a bone-shaped cross-sectional area or a rectangular cross-sectional area. In addition, protrusions with different cross-sectional areas can be combined with each other on one compensation element.

It is as well conceivable, that adjacently-arranged, projecting protrusions for preventing linear weakening lines are arranged laterally offset to one another. This way, it can be prevented that the compensation element has weakening lines running linear or in parallel or rectangular, respectively, to the lateral edges of the compensation element, which eventually coincide with the tile gaps between the covering elements arranged above and on which cracks, damages or ruptures are very likely to occur in the floor covering arrangement in the case of mechanical stress.

To this end, the compensation element may comprise exclusively such weakening lines extending from one lateral edge to another lateral edge of the compensation element and multiple sections of weakening lines orientated in an angle to one another. Each intermediate space between adjacent protrusions constitutes a section of a weakening line and is part of a weakening line, so that weakening lines running in a straight line over the compensation element are excluded between the protrusions arranged at a distance.

Here, the individual protrusions may have simple basic shapes such as squares or rectangles. Adjacent protrusions must then be arranged offset to one another, so that a section of a weakening line arranged between two protrusions which are arranged next to one another coincides with a neighboring protrusion that is arranged laterally offset.

According to an advantageous configuration of the inventive idea, it is provided that the protrusions have a bone-shaped surface area. The bone-shaped protrusions may either be parallel or respectively laterally turned to one another by 90°, but as well be laterally offset to one another. The weakening lines running between the individual bone-shapes protrusions and are limited by them have a curved or respectively bent run in every place. A linear-running lateral edge of a floor covering element arranged on the decoupling mat runs alternating over sections of weakening lines and over protrusions, so that coinciding of longer sections of weakening lines with the lateral edge of the floor covering element is excluded.

It is as well conceivable and advantageous for the protrusions to have an angular surface area. Adjacent protrusions, respectively having an angular surface area, can be arranged laterally offset from one another in such a way that a corner region of a first protrusion borders an angular region of a second, neighboring protrusion longitudinal to its to lateral edges running towards each other. Although every individual protrusion has linear-running lateral edges, longer sections of weakening lines having a linear-running section line can be avoided.

Dependent of the surface area predetermined for the individual protrusions, it may be expedient, that a least two groups of protrusions having directions deviating from one another are arranged on the compensation element. In particular in connection with a lateral offset between adjacent protrusions can therefore be achieved complex patterns of protrusions not allowing for longer linear-running sections of weakening lines.

Such a decoupling mat can particularly advantageously be used for decoupling a tile covering from a subfloor. For conventional tile coverings, in which the individual tiles have lateral edges with a length of between 20 cm and 60 cm, it is advantageous for a maximum distance of two opposite lateral edges to range between 1 cm and 15 cm, preferably between 1.5 cm and 5 cm. This way, it can be ensured that every individual tile laid out on the decoupling mat covers a greater number of protrusions and accordingly a greater number of individual, linear sections of weakening lines.

Figure 2:
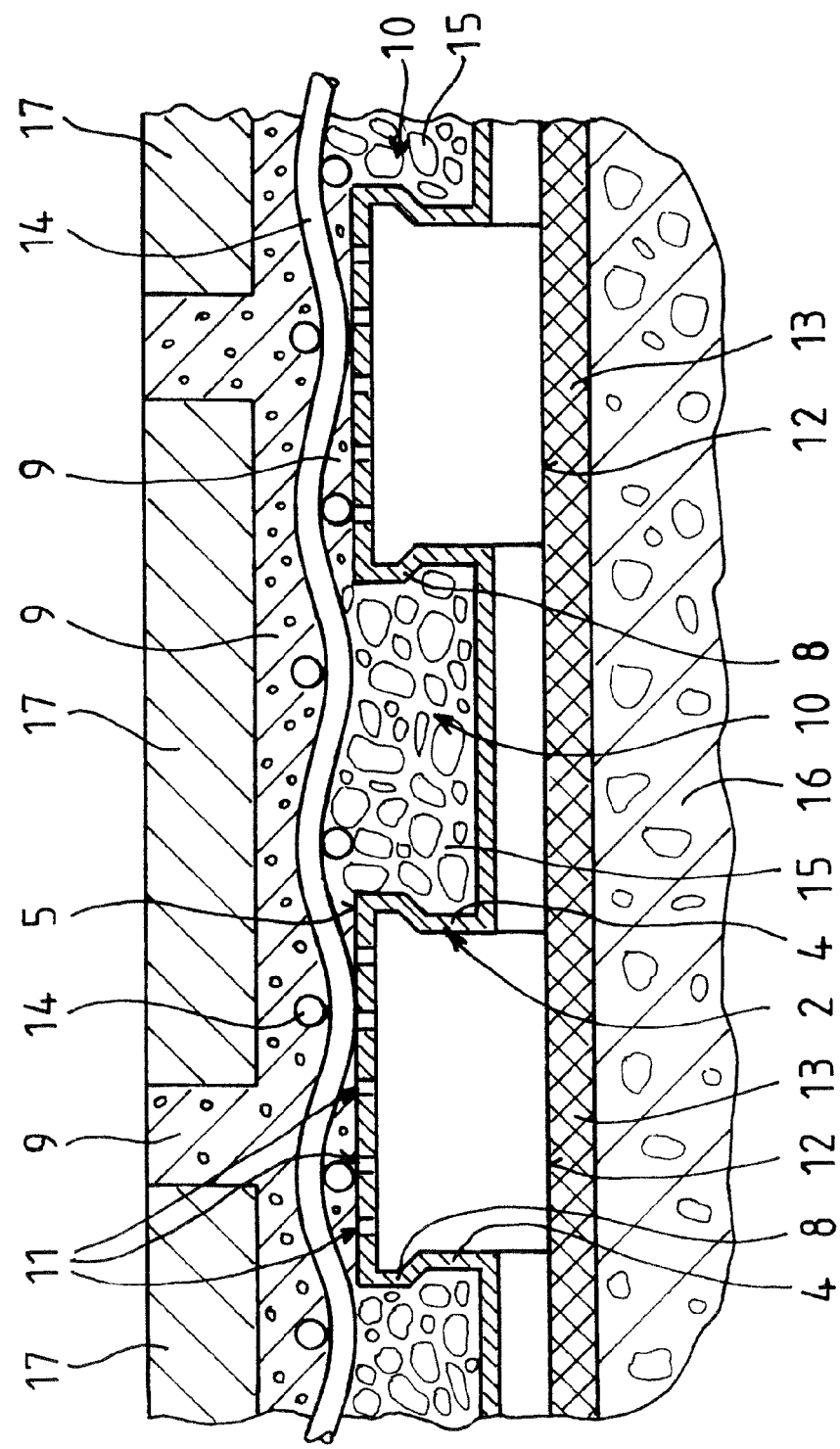
Figure 3:
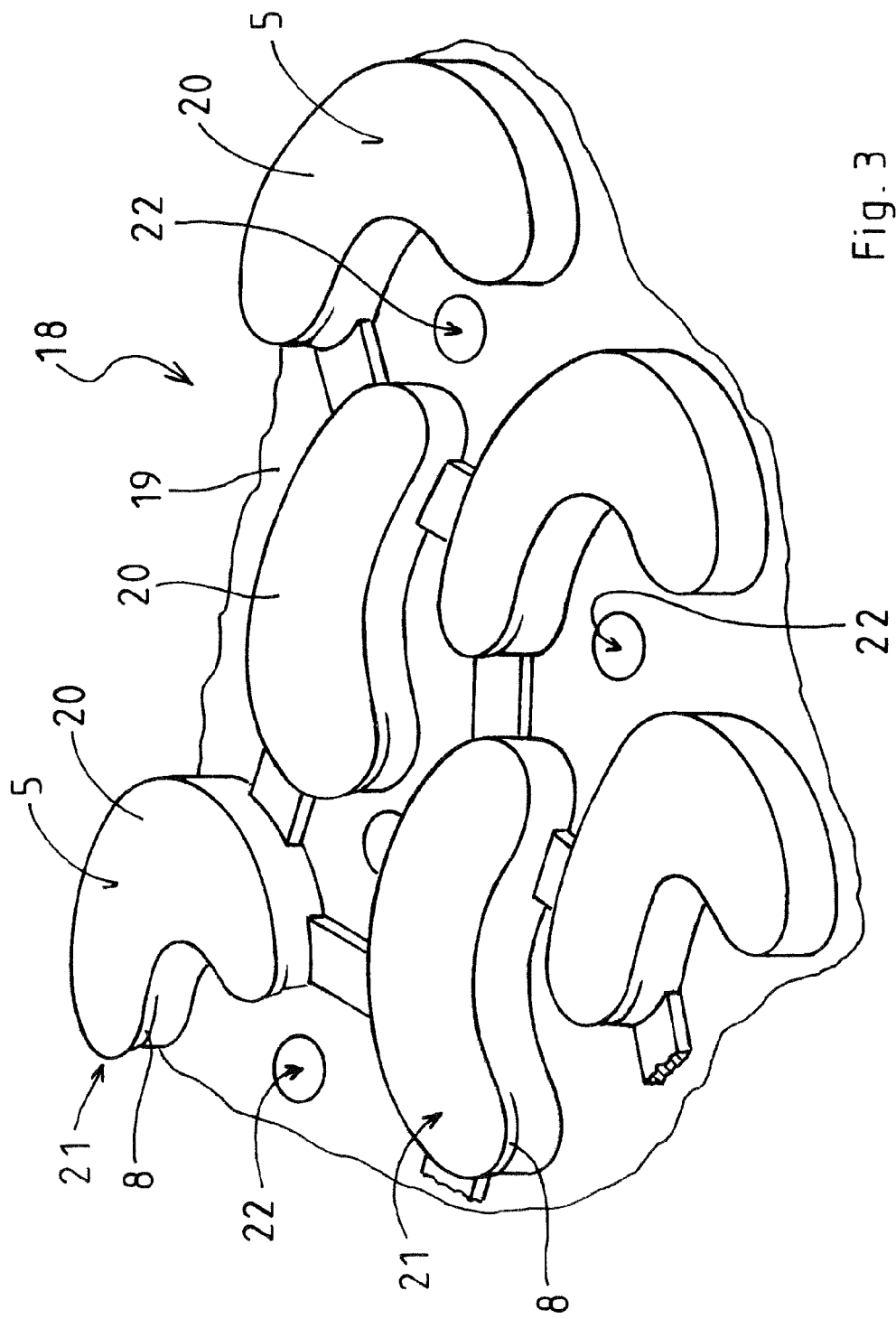
Figure 4:
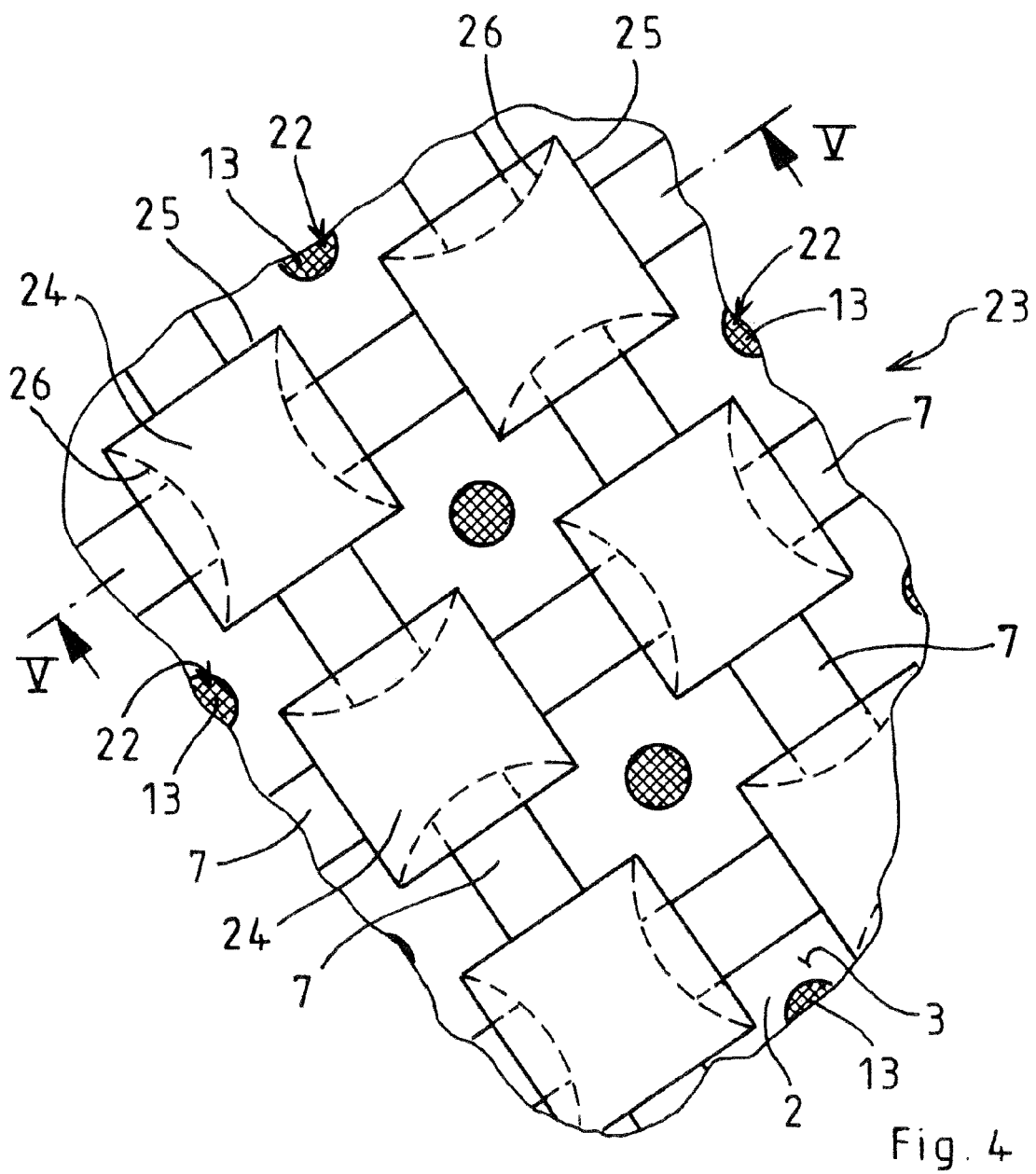
Figure 5:
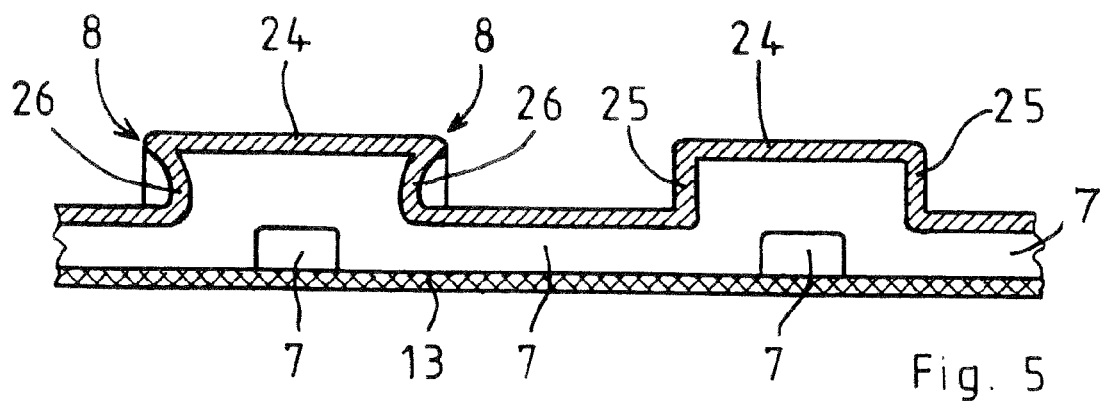
Figure 6:
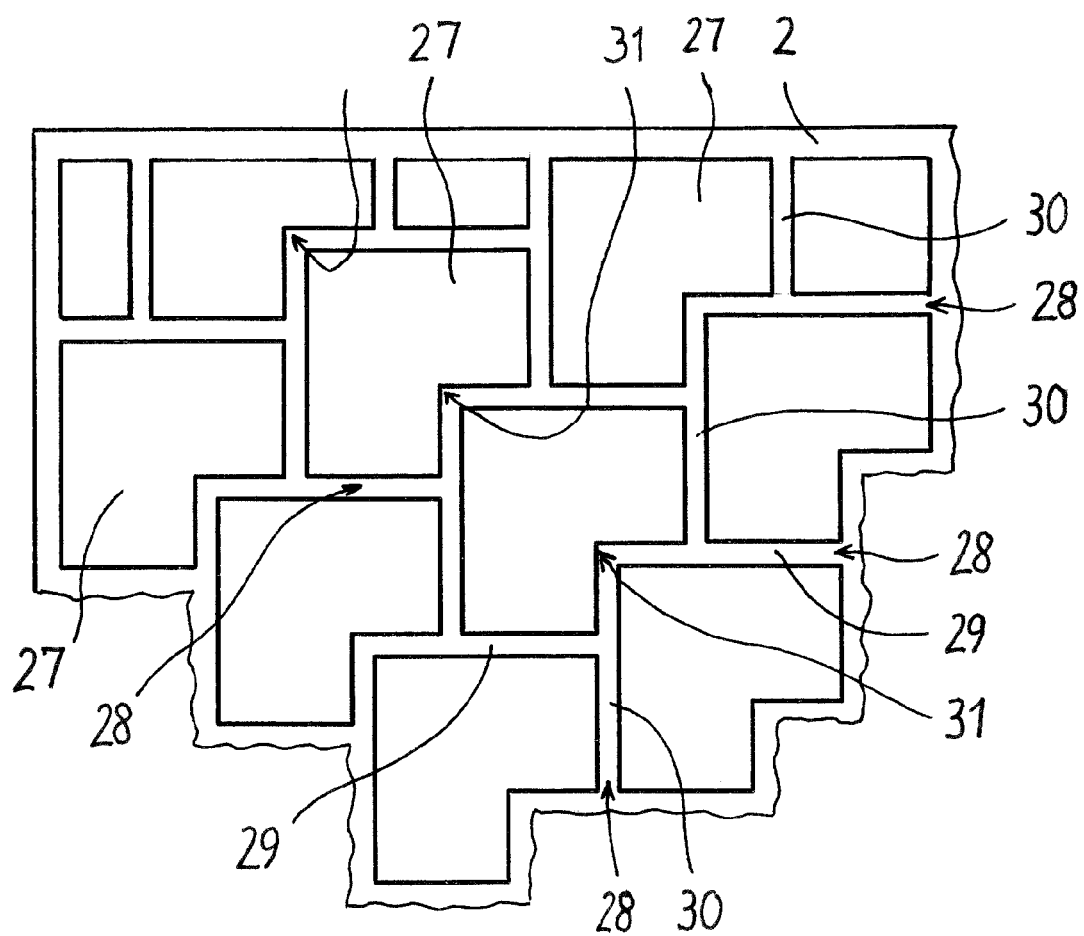
Figure 7:
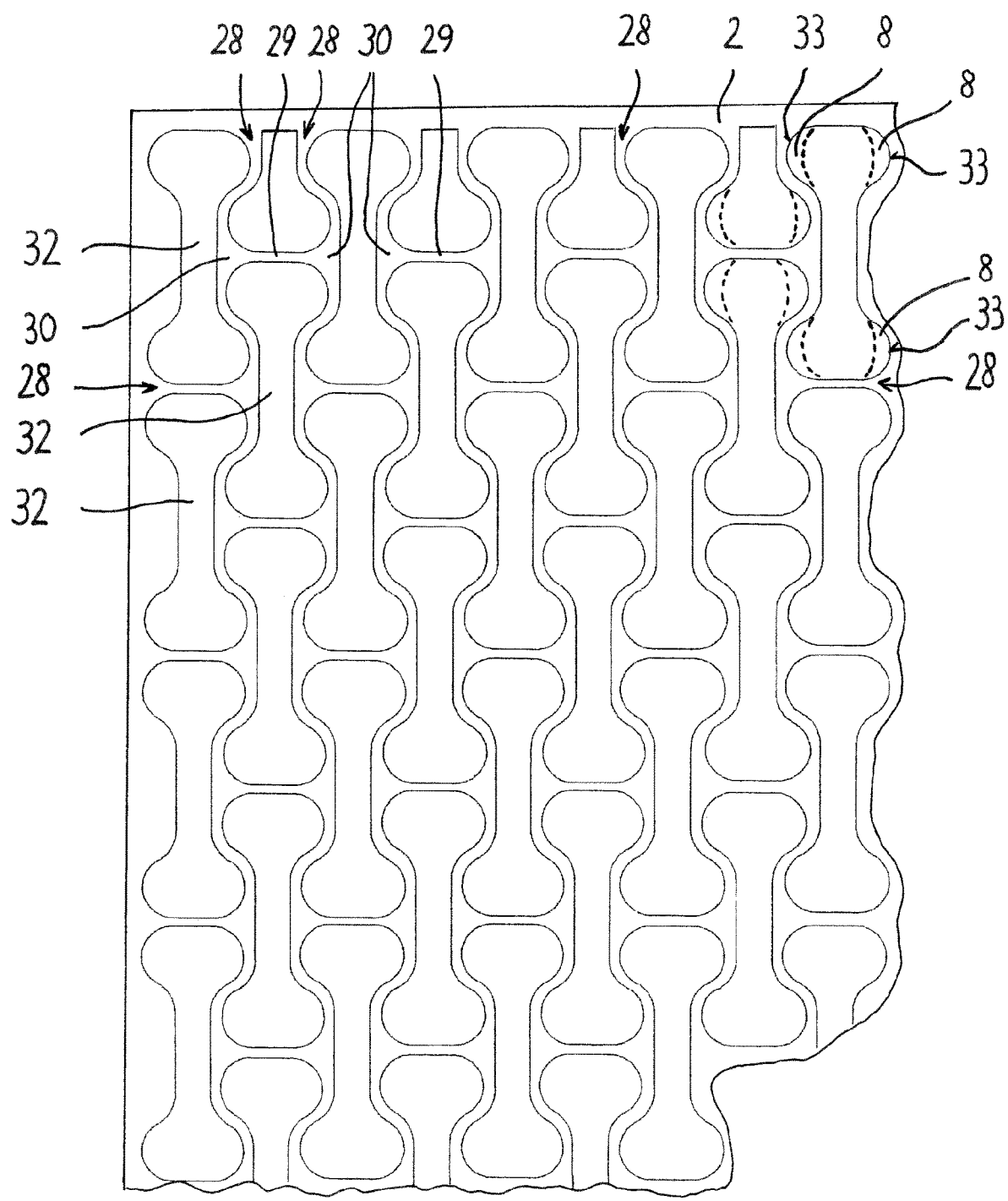
Figure 8:
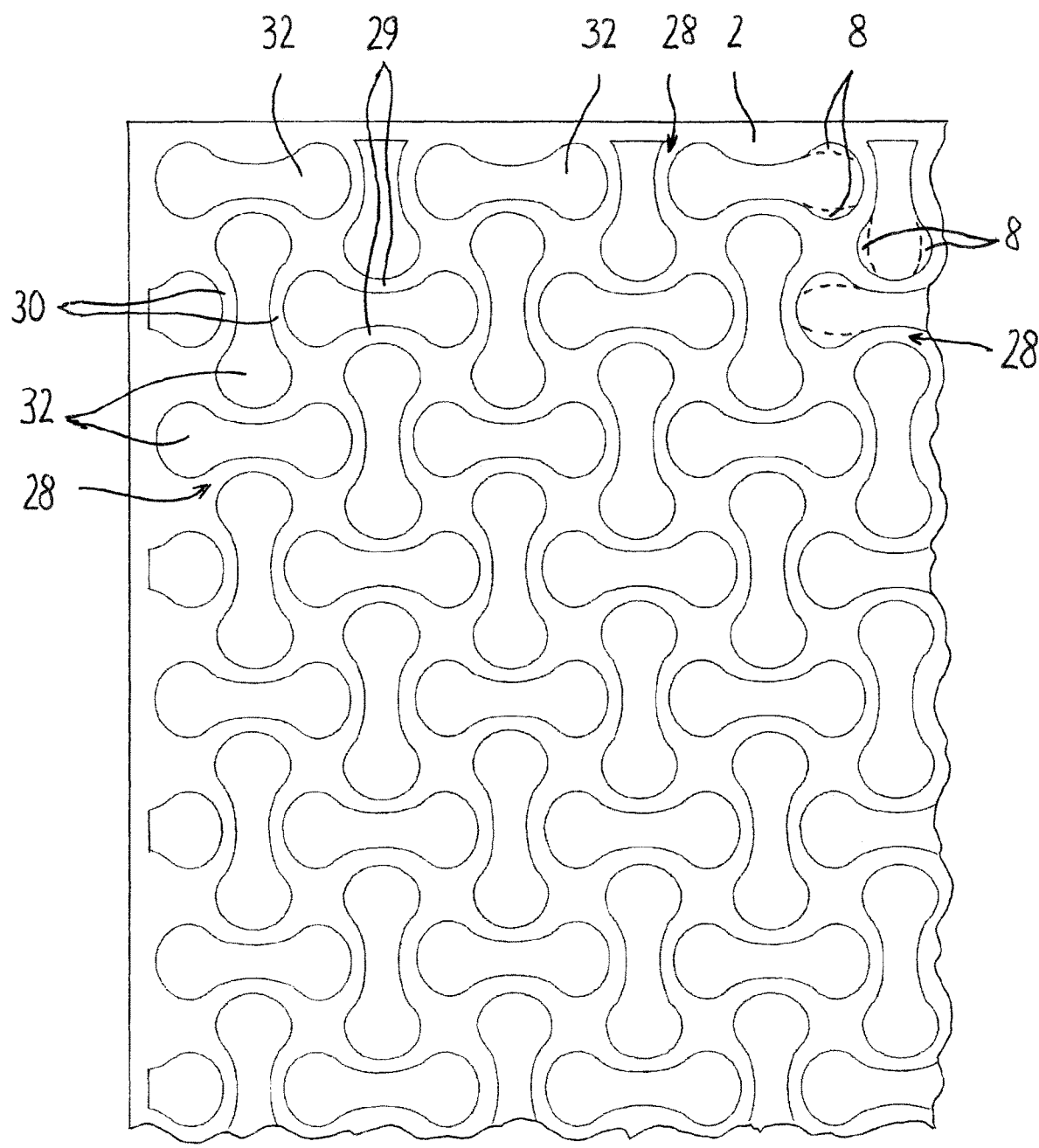
Figure 9:
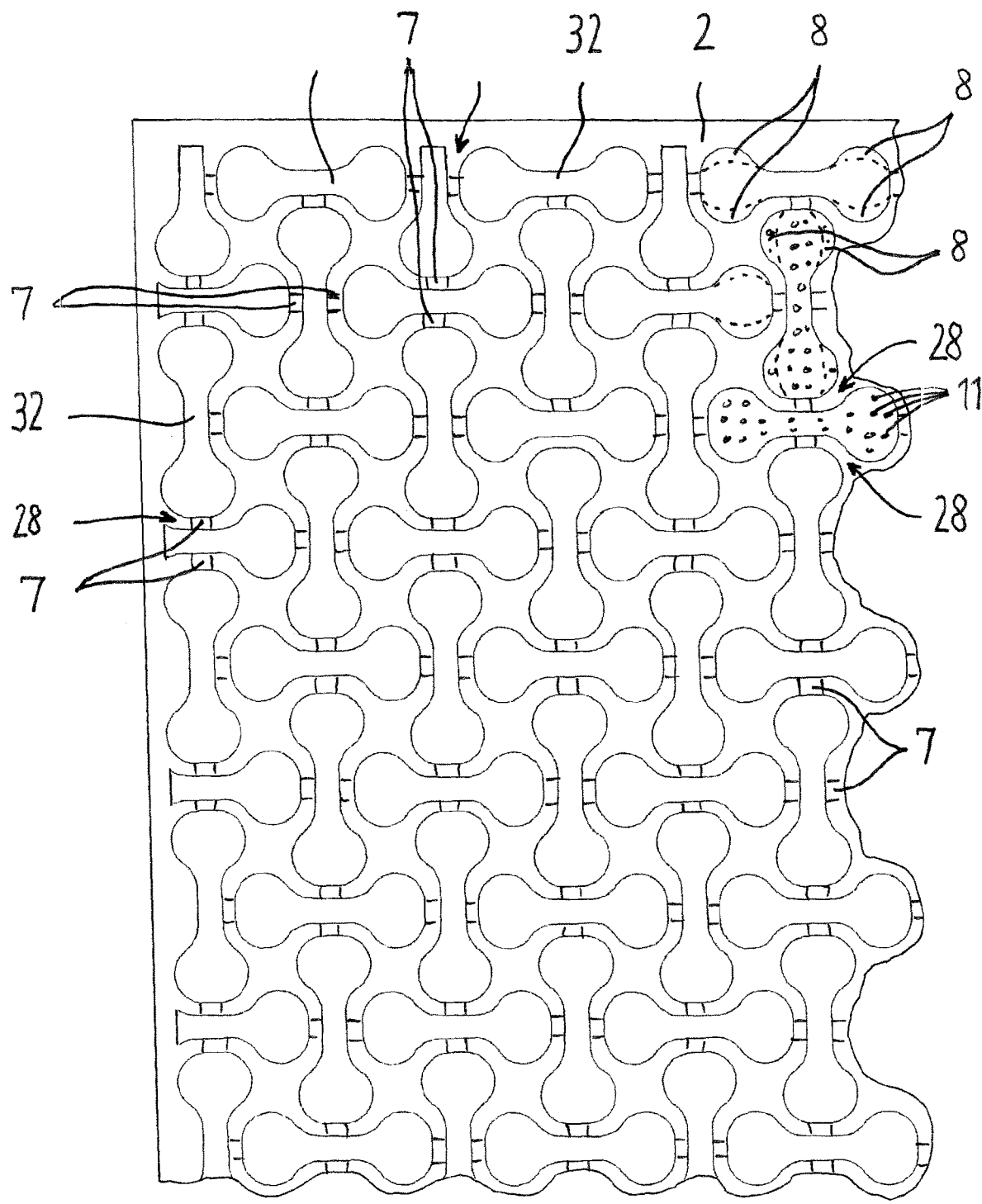
Figure 10:
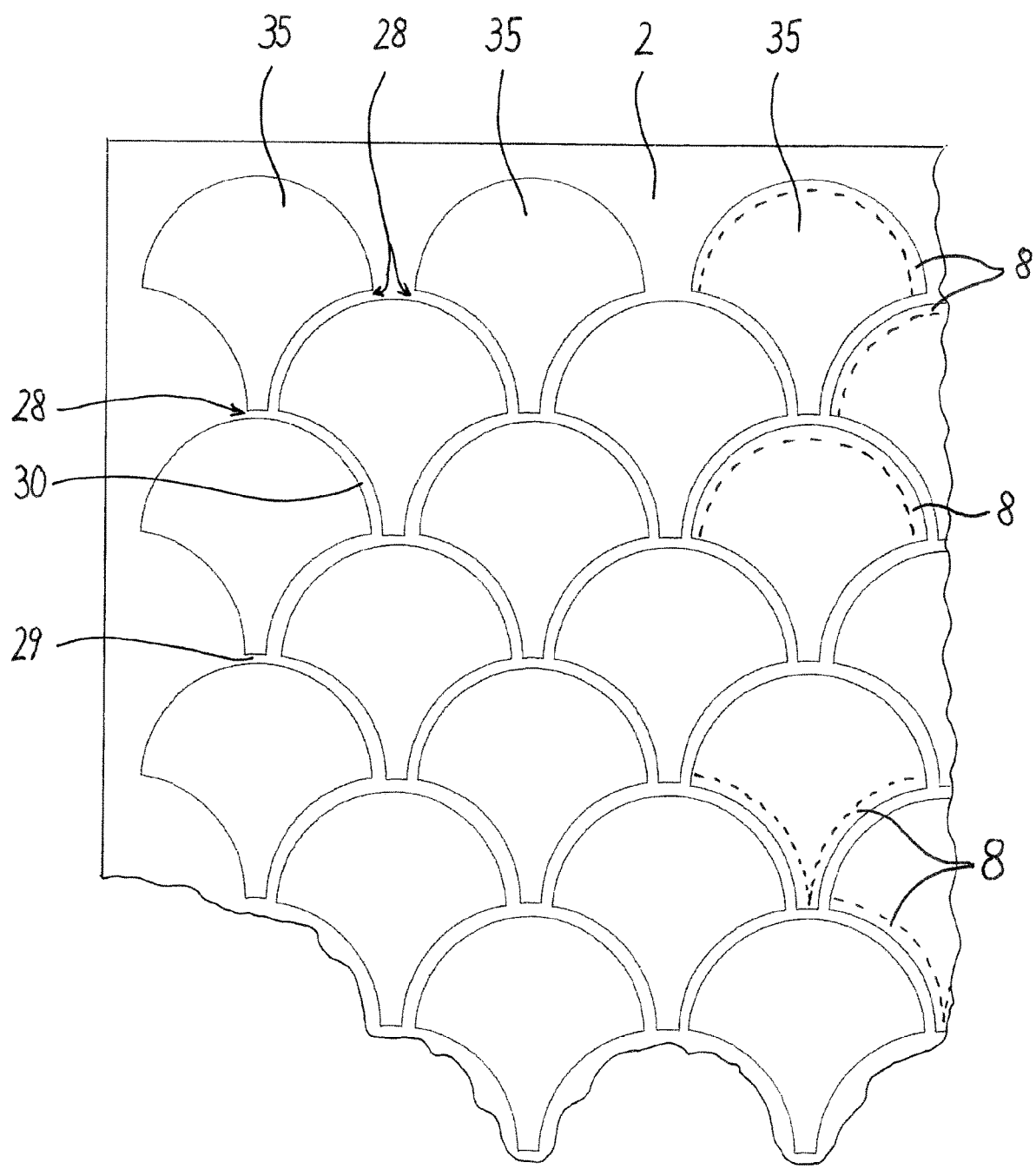

In the following, exemplary embodiments illustrated in the figures are explained in greater detail. The figures show in:

FIG. 1 a perspective view of a schematic illustration of a decoupling mat with a strip-shaped compensation element with square-shaped projecting protrusions and ventilation ducts interconnecting the protrusions, FIG. 2 a view of the decoupling mat of FIG. 1 along the line II-II, wherein an impact-reducing layer is arranged on a top side of the compensation element and a grid mat is arranged on an upper bearing plane, FIG. 3 a perspective view of a decoupling mat with differently-designed convex protrusions which are arranged relatively offset to one another, FIG. 4 a view of a top side of a decoupling mat similar to FIG. 1, with the undercuts formed on curved side wall regions of the protrusions and the undercuts project in different directions from adjacent protrusions, FIG. 5 a sectional view of the decoupling mat shown in FIG. 4 along the Line V-V in FIG. 4, FIG. 6 a schematic view of a top side of a compensation element with projecting, angle-shaped protrusions, FIG. 7 a schematic view of a top side of a compensation element with bone-shaped protrusions, FIG. 8 a schematic view of a top side of a compensation element with bone-shaped protrusions of a deviating design, FIG. 9 a schematic view of a top side of a compensation element with in turn bone-shaped protrusions of a deviating design, and FIG. 10 a schematic view of a top side of a compensation element with shell-shaped protrusions.

The decoupling mat 1 illustrated in FIGS. 1 and 2 comprises a strip-shaped compensation element 2. Starting from a lower bearing plane 3, upwardly-projecting protrusions 4 having a squared cross-sectional area are formed on the compensation element 2. Top sides 5 of the upwardly-projecting protrusions 4, said sides formed as to be aligned to one another, form a top bearing plane 6. Ventilation ducts 7 extend between the individual projecting protrusions 4, which connect the neighboring protrusions 4. The ventilation ducts 7 run along the lower bearing plane 3 and do not extend in vertical direction to the lower bearing plane 3 all the way till the upper bearing plane 6, but merely in a maximum height of about one third up to half the height of the projecting protrusions 4.

Along a circumferential line, the projecting protrusions 4 comprise undercuts 8, at least in sections, with the undercuts being arranged in the area of the upper bearing plane 6. An adhesive mortar 9 (only illustrated in FIG. 2) applied to the decoupling mat 1 from the top may enter the interspaces 10 between the spaced projecting protrusions 4 and engage behind the undercuts 8, thereby resulting in a form-fit connection of the adhesive mortar 9 with the compensation element 2.

A number of cut-outs 11 is arranged in the top sides 5 of the projecting protrusions 4, respectively. The cut-outs 11 have been introduced into the compensation element 2 using a spiked roller afterwards. On the one hand, the dimensions of the individual cut-outs 11 are small enough to prevent adhesive mortar 9 applied from the top side from entering inner spaces of the protrusions 4. At the same time, dimensions of cut-outs 11 are large enough in order to make the top side 5 or bearing plane 6, respectively, of the compensation element 2 sufficiently permeable to moisture so that an eventually existing or respectively developing moisture gradient between below the lower bearing plane 3 and above the upper bearing plane 5 can be compensated in short time.

An interlocking nonwoven 13, arranged on a lower side 12 of the lower bearing plane 3, is fixed to the compensation element 2. Immediately after production of the compensation element 2 consisting of synthetic material, the interlocking nonwoven 13 is pushed into the yet soft and sticky synthetic material and is thereby connected to the compensation element 2 in a highly-resistant manner.

Directly above the upper bearing plane 5, a fabric mesh 14 is fixed to the upper sides 5 of the projecting protrusions 4. Just like the undercuts 8, said fabric mesh 14 of a suitable fabrics material serves for fixing and connecting the initially paste-like adhesive mortar 9 applied from the top, which encloses the fabric mesh 14 in sections and cures subsequently.

A layer 15 of impact-reducing material is arranged on the compensation element 2 located in particular between the individual projecting protrusions 4. A sand bound sand crosslinked with a binding agent can be used as an impact-reducing material. Just as well, a suitable foamed material or a pourable granular material could be used for reducing sound transmission and noise generation.

FIG. 2 shows the decoupling mat 1 together with the surrounding floor covering structure. The decoupling mat 1 can directly be laid on a subfloor 16 or bonded to the subfloor 16. Floor tiles 17, made of a ceramic material or of stoneware, are embedded into the adhesive mortar 9, which is applied from above on the decoupling mat 1.

The decoupling mat 1 can also be used for fixing a wall covering to a wall.

Merely in an exemplary manner, FIG. 3 shows a variant of a decoupling mat 18 of a different design. A compensation element 19 used with this decoupling mat 18, has kidney-shaped projecting cut-outs 20 having a non-convex cross-sectional area. The top side 5 of the kidney-shaped, projecting cut-outs 20 is not perforated and does not have any openings. The undercuts 18 are located merely on certain end regions 21 of the projecting protrusions 20. Through-openings 22 are formed in the lower bearing plane 3 of the compensation element 19. In the exemplary exemplary embodiment, through-openings 22 are illustrated as circular bores or perforations. However, the through-openings 22 can as well be formed as strip-shaped slots or millings in the lower bearing plane 3.

In the decoupling mat 23 illustrated in FIGS. 4 and 5, protrusions 24 with an almost square cross-sectional area are arranged at regular distances to one another on the compensation element 2 and interconnected by the ventilation ducts 7. Said protrusions 24 comprise in each case two opposite and linear side wall regions 25 as well as two opposite side wall regions 26 running in a curved or a bent manner. The undercuts 8 each formed on the concavely-running side wall regions 26 each project at adjacently-arranged protrusions 24 laterally in different directions from the concavely-running side wall regions 26. The orientation of the undercuts 8 changes with adjacently-arranged protrusions 24, respectively.

The interlocking nonwoven 13 is fixed to the lower side 12 of the lower bearing plane 3 of the compensation element 2. The compensation element 2 comprises through-openings 22 formed in each case in the lower bearing plane 3 between the protrusions 24.

A compensation element 2 schematically illustrated in FIG. 6, is made of a rigid plastics film. On its top side, the compensation element 2 has regular angular protrusions 27, respectively arranged laterally offset to one another. Merely on a lateral edge of the compensation element 2, the protrusions 27 have accordingly adapted shapes 27 deviating from the angular shape. Weakening lines 28 are formed between neighboring protrusions 27, which can extend over the entire lower side of the compensation element 2. The weakening lines 28 consist of individual sections 29, 30 of weakening lines merging into one another, said sections running perpendicularly and horizontally in the illustration of FIG. 6.

The individual sections 29, 30 of weakening lines are each linear until an end region of the concerned section of a weakening line coincides with an adjacent protrusion 2 or until an end region of a linear section 29, 30 of a weakening line coincides with a protrusion 2 on a corner 31 in the protrusion 2. In these places the orientation of the adjacent section 29, 30 of a weakening line, and therefore the course of weakening line 28, changes.

As can be taken from FIG. 6, sections 29, 30 of linear weakening lines extend at most over two neighboring protrusions 2. In each case two neighboring protrusions 2 are located laterally offset opposite two further neighboring protrusions 2. The respective opposite protrusions 2 form the lateral boundary for the sections 29, 30 of weakening lines. The distance between two opposite protrusions 2 and therefore the width of the individual sections of weakening lines 29, 30 is several millimeters. Since linear sections 29, 30 of weakening lines can in each case only extend along two neighboring protrusions 2 and therefore the maximum length of a linear-running line 28, which is inevitably formed upon production of the floor covering structure, is limited.

The individual, angular-shaped protrusions 2 have suitable dimensions of the angularly-connected legs, so that in case of a lateral offset of neighboring, respectively opposite protrusions 2, only most short sections of linear weakening lines 29, 30 are formed.

FIG. 7 exemplarily shows a top side of a compensation element 2 having protrusions 32, wherein the individual protrusions 32 have a bone-shaped design. This shape is a non-convex shape, just like in the exemplary embodiment shown in FIG. 6. By means of arranging neighboring protrusions 32 offset in two spatial directions, in this exemplary embodiment, linear sections 29, 30 of weakening lines are limited to short regions, and as well extend along two neighboring protrusions 32 at the most. Respective neighboring protrusions 32 are arranged next to one another in such a narrow way that the protrusions 32, in sections, extend into a surface enclosed by a neighboring protrusion on two or more sides and would overlap if the neighboring protrusion 32 had no cut-out there.

In each case, undercuts 8 are formed in the region of the convex side wall sections 33 of the bone-shaped protrusions 32, whereas in FIG. 7, undercuts 8 are illustrated merely as an example in an upper right area of the drawing. Arranging the undercuts 8 in an opposite manner allows for advantageous adhesion and deformation properties relative to the subfloor with a shear force load of a floor covering resting on the compensation element 2.

In a merely exemplary manner, FIGS. 8 and 9 illustrate further exemplary embodiments for a compensation element 2 with respective bone-shaped protrusions 32. In the exemplary embodiment according to FIG. 8, side walls 34 have a profile that is significantly more rounded when compared to the exemplary embodiments according to FIGS. 7 and 9. In the exemplary embodiment according to FIG. 9, the bone-shaped protrusions 32 are very similar to the bone-shaped protrusions 32 in the exemplary embodiment according to FIG. 7. However, respective neighboring bone-shaped protrusions 32 are arranged to one another at an angle of in each case 90°.

In an exemplary embodiment according to FIG. 10, the individual protrusions 35 in each case have a shell-shaped shape.

In the exemplary embodiments according to FIGS. 6 to 10, the individual protrusions 27, 32 and 35 each comprise undercuts 8 arranged in regions along a circumference of protrusions 27, 32 and 35, which are merely exemplary shown in small areas. An advantageous clamping effect is achieved by means of the undercuts 8, which in some variants are arranged in pairs also in different directions, said clamping effect allowing for a particularly high tolerance to mechanical stress of the compensation element 2 and therefore for an advantageous balancing and compensating effect between an overlying floor covering 17 and the subfloor 16.

Throughout the exemplary embodiments, the undercuts 8 can selectively be formed along individual circumferential sections of protrusions 4, 20, 24, 27, 32 and 35, on opposite regions of protrusions 4, 20, 24, 27, 32 or entirely along the circumferential lines of protrusions 4, 20, 24, 27, and 32.

The top sides 5 of the bearing planes 6 of protrusions 4, 20, 24, 27, and 32 may selectively comprise moisture-permeable cut-outs 11, as this is indicated in an exemplary manner in an individual region on the right in FIG. 9, or can be formed in a closed manner.

The invention claimed is:

1. Decoupling mat for a surface covering structure that can be covered by covering elements comprising:
a strip- or plate-shaped compensation element having a lower bearing plane comprising upwardly projecting protrusions,
the protrusions forming an upper bearing plane at a distance from the lower bearing plane, wherein the protrusions:
are arranged spaced apart from one another,
have at least in sections an undercut along their periphery, and
are in said sections wider towards the upper bearing plane than the lower bearing plane, wherein the undercut(s) is/are adapted to allow fixation of an adhesive mortar applied to a top of the compensation element; and wherein a water-permeable cover is fixed onto the bottom side of the lower bearing plane, wherein the water-permeable cover prevents penetration of a viscous adhesive into the upwardly projecting protrusions, wherein a plurality of the protrusions that are adjacent to one another are connected by ventilation ducts projecting from the lower bearing plane, wherein the ventilation ducts do not extend up to the upper bearing plane.

2. The decoupling mat of claim 1, wherein the undercuts are adapted to engage with the adhesive mortar.

3. The decoupling mat of claim 1, wherein a plurality of first undercuts of the undercuts is oriented in a first direction and a plurality of second undercuts of the undercuts is oriented in a second direction and the first and second undercuts are facing each other.

4. The decoupling mat of claim 1, wherein the cover comprises a perforation.

5. The decoupling mat of claim 1, wherein the cover comprises a water-permeable textile woven or laid fabric or a water-permeable non-woven fabric.

6. The decoupling mat of claim 1, wherein the compensation element comprises cut-outs or slots in the lower bearing plane.

7. The decoupling mat of claim 6, wherein the cover and the compensation element each comprise cut-outs or slots which overlap at least sectionally.

8. The decoupling mat of claim 1, wherein the compensation element comprises a number of cut-outs in the area of the upper bearing plane.

9. The decoupling mat of claim 8, wherein each upwardly projecting protrusion comprises at least one cut-out in the area of the upper bearing plane.

10. The decoupling mat of claim 8, wherein the upper bearing plane of the compensation element comprises a perforation.

11. The decoupling mat of claim 1, wherein the compensation element comprises dehumidifying openings in an area of side walls of the upwardly projecting protrusions.

12. The decoupling mat of claim 1, wherein a layer of an impact sound-reducing material is arranged on the compensation element.

13. The decoupling mat of claim 12, wherein the layer comprises a bonded sand crosslinked with a binding agent.

14. The decoupling mat of claim 1, wherein a fabric mesh is arranged on the upper bearing plane.

15. The decoupling mat of claim 1, wherein the upwardly projecting protrusions are arranged adjacently and are laterally offset to one another, wherein linear sections extending between the protrusions extend along not more than two neighboring protrusions.

16. The decoupling mat of claim 1, wherein the upwardly projecting protrusions having a cross-sectional area running parallel to the lower bearing plane wherein the cross-sectional area is not convex.

17. The decoupling mat of claim 16, wherein the protrusions have a bone-shaped surface area.

18. The decoupling mat of claim 16, wherein the protrusions have an angular-shaped surface area.

19. The decoupling mat of claim 1, wherein the protrusions comprise an undercut on two sections of side walls of the protrusions that are opposite to each other.

\* \* \* \* \*